(12) United States Patent
Gschwind

(10) Patent No.: US 7,523,298 B2
(45) Date of Patent: Apr. 21, 2009

(54) POLYMORPHIC BRANCH PREDICTOR AND METHOD WITH SELECTABLE MODE OF PREDICTION

(75) Inventor: Michael Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 11/417,847

(22) Filed: May 4, 2006

(65) Prior Publication Data

US 2008/0005542 A1 Jan. 3, 2008

(51) Int. Cl.
*G06F 7/38* (2006.01)
*G06F 9/00* (2006.01)
*G06F 9/44* (2006.01)
*G06F 15/00* (2006.01)

(52) U.S. Cl. .................. 712/239; 712/237; 712/238; 712/240

(58) Field of Classification Search ................ 712/237, 712/238, 239, 240
See application file for complete search history.

(56) References Cited

U.S. PATENT DOCUMENTS 5,758,142 A * 5/1998 McFarling et al. ........... 712/239
6,425,075 B1 * 7/2002 Stiles et al. .................. 712/239
6,550,004 B1 * 4/2003 Henry et al. ................. 712/239
2003/0065912 A1 * 4/2003 Hum et al. ................... 712/239

OTHER PUBLICATIONS

Scott McFarling, "Combining Branch Predictors", WRL No. 36'; pp. 1-25; 1993.
Jimenez et al., "Branch Path Re-Aliasing" Proceedings of the 4th Workshop on Feedback Directed and Dynamic Optimization: 10 pages; Dec. 2001.
G. Palermo, et al., "Branch Predication Techniques for Low-Power VLIW Processors", GLSVLSI, pp. 225-228; Apr. 28-29, 2003.
Toni Juan et al., "Dynamic History-Length Fitting: A third level of adaptivity for branch prediction", IEEE; pp. 155-166; 1998.
A. Dhodapkar et al., "Tuning Adaptive Microarchitectures", Dept of Elec. & Computer Engineering, Univ. of Wisconsin; 25 pages; 2003.
S. Mamidi et al., "Automated Generation of Configurable Media Processors"; IEEE; 5 pages; Nov. 2003.
Mike Clark et al., "Performance Evaluation of Configurable Hardware Features on the AMD-K5"; ICCD; 6 pages; 1999.

* cited by examiner

*Primary Examiner*—Niketa I Patel
*Assistant Examiner*—Juanito C Borromeo
(74) *Attorney, Agent, or Firm*—Keusey, Tutunjian & Bitetto, P.C.; Kenneth Corsello, Esq.

(57) ABSTRACT

A polymorphic branch predictor and method includes a plurality of branch prediction methods. The methods are selectively enabled to perform branch prediction. A selection mechanism is configured to select one or more of the branch prediction methods in accordance with a dynamic setting to optimize performance of the branch predictor during operation in accordance with a current task.

20 Claims, 12 Drawing Sheets

POLYMORPHIC BRANCH PREDICTOR AND METHOD WITH SELECTABLE MODE OF PREDICTION

BACKGROUND

1. Technical Field

The present invention relates generally relates to processing of branch instructions in a microprocessor, and more particularly, to methods and apparatus for implementing polymorphic branch predictors.

2. Description of the Related Art

Modern processors achieve performance by applying prediction techniques to address pipeline disruption events, such as branch operations. In accordance with the prior art, a variety of branch processing techniques have been provided. A branch predictor is the part of a processor that determines whether a conditional branch in the instruction flow of a program is likely to be taken or not. This is called branch prediction. Branch predictors are crucial in today's modern, superscalar processors for achieving high performance. Branch predictors permit processors to fetch and execute instructions without waiting for a branch to be resolved.

Early implementations of RISC architectures did trivial branch prediction: e.g., the architectures always predicted that a branch (or unconditional jump) would not be taken, so they always fetched the next sequential instruction. Only when the branch or jump was evaluated did the instruction fetch pointer get set to a nonsequential address. These CPUs evaluated branches in the decode stage and had a single cycle instruction fetch. As a result, the branch target recurrence was two cycles long, and the machine would always fetch the instruction immediately after any taken branch. Some architectures defined branch delay slots in order to utilize these fetched instructions.

Processors that implement "static prediction" predict that backwards pointing branches will be taken (assuming that the backwards branch is the bottom of a program loop), and forwards pointing branches will not be taken (assuming they are early exits from the loop or other processing code). For a loop that executes many times, this only mispredicts the very last branch of the loop. Static prediction is used as a fall-back technique (when there is no any information for dynamic predictors to use) in most processors with dynamic branch prediction.

Some superscalar processors fetch, with each line of instructions, a pointer to the next line. This next line predictor is not directly comparable to the other predictors listed here because the next line predictor handles branch target prediction as well as branch direction prediction. When a next line predictor points to aligned groups of 2, 4 or 8 instructions, the branch target will usually not be the first instruction fetched, and so the initial instructions fetched are wasted. Assuming for simplicity a uniform distribution of branch targets, 0.5, 1.5, and 3.5 instructions fetched are discarded, respectively.

Since the branch itself will generally not be the last instruction in an aligned group, instructions after the taken branch (or its delay slot) will be discarded. Once again, assuming a uniform distribution of branch instruction placements, 0.5, 1.5, and 3.5 instructions fetched are discarded. The discarded instructions at the branch and destination lines add up to nearly a complete fetch cycle, even for a single-cycle next-line predictor.

A bimodal branch predictor has a table of two-bit saturating counters, indexed with the least significant bits of the instruction addresses. Unlike the instruction cache, bimodal predictor entries typically do not have tags, and so a particular counter may be mapped to different branch instructions (this is called branch interference or branch aliasing), in which case it is likely to be less accurate. Each counter has one of four states: 1) Strongly not taken, 2) Weakly not taken, 3) Weakly taken and 4) Strongly taken.

When a branch is evaluated, the corresponding counter is updated. Branches evaluated as not taken decrement the state towards strongly not taken, and branches evaluated as taken increment the state towards strongly taken. The primary benefit of this two bit saturating counter scheme is that loop closing branches are always predicted taken. A one-bit scheme, mispredicts both the first and last branch of a loop. A two-bit scheme mispredicts just the last branch. Similarly, on heavily biased branches which almost always go one way, a one-bit scheme mispredicts twice for each odd branch, and a two-bit scheme mispredicts once.

Because the bimodal counter table is indexed with the instruction address bits, a superscalar processor can split the table into separate SRAMs for each instruction fetched, and fetch a prediction for every instruction in parallel with fetching the instruction, so that the branch prediction is available as soon as the branch is decoded. In addition to 2-bit predictors, a variety of similar saturating counter based predictors using n bits are possible.

Bimodal branch prediction mispredicts the exit of every loop. For loops which tend to have the same loop count every time (and for many other branches with repetitive behavior), some predictors can do better. Local branch predictors keep two tables. The first table is the local branch history table. It is indexed by the low-order bits of the branch instruction's address, and it records the taken/not-taken history of the n most recent executions of the branch. The other table is the pattern history table. This table includes the actual predictors; however, its index is generated from the branch history in the first table. To predict a branch, the branch history is looked up, and that history is then used to look up a predictor to make a prediction. This approach can use either a single bit predictor, or an n bit predictor (such as bimodal predictor).

Local prediction is slower than bimodal prediction because local prediction requires two sequential table lookups for each prediction. A fast implementation would use a separate bimodal counter array for each instruction fetched, so that the second array access can proceed in parallel with instruction fetch. These arrays are not redundant, as each counter is intended to store the behavior of a single branch. Global branch predictors make use of the fact that the behavior of many branches is strongly correlated with the history of other recently taken branches. In one implementation, a predictor can keep a single shift register updated with the recent history of every branch executed, and use this value to index into a table of predictors (e.g., single bit or bimodal counter predictors).

A gselect predictor indexes a table of predictors with the recent history concatenated with a few bits of the branch instruction's address. Gselect does better than local prediction for small table sizes, and local prediction is only slightly better for table storage larger than 1 KB. Another implementation offers better prediction accuracy than gselect by XOR-ing the branch instruction address with the global history, rather than concatenating, at the cost of the more expensive XOR in lieu of a simple concatenation. This predictor is referred to as gshare, which is a little better than gselect for tables larger than 256 bytes.

Gselect and gshare are easier to make fast than local prediction, because they require a single table lookup per branch. As with bimodal prediction, the table can be split so that parallel lookups can be made for each instruction fetched, so that the table lookup can proceed in parallel with instruction load. Scott McFarling proposed combined branch prediction in "Combining Branch Predictors", WRL Technical Note 36, 1993. Such combined predictors are referred to as multi-component predictors in the descriptions hereinbelow. Combined branch prediction is about as accurate as local prediction, and almost as fast as global prediction.

Combined branch prediction uses three predictors in parallel: e.g., a local bimodal, gshare, and a bimodal-like predictor to pick which of bimodal or gshare to use on a branch-by-branch basis. The choice predictor can be a single bit predictor, or saturating n bit counter, used for choosing the prediction to use. In this case the counter is updated whenever the bimodal and gshare predictions disagree, to select which result to choose. Another way of combining branch predictors is to have, e.g., 3 different branch predictors, and merge their results by a majority vote. Predictors like gshare use multiple table entries to track the behavior of any particular branch. This multiplication of entries makes it much more likely that two branches will map to the same table entry (a situation called aliasing), which in turn makes it much more likely that prediction accuracy will suffer for those branches. Once multiple predictors are employed, it is beneficial to arrange that each predictor will have different aliasing patterns, so that it is more likely that at least one predictor will have no aliasing. Combined predictors with different indexing functions for the different predictors are called gskew predictors, and are analogous to skewed caches used for data and instruction caching.

Another technique to reduce destructive aliasing within the pattern history tables is an agree predictor. A method is used to establish a relatively static prediction for the branch, perhaps a bimodal predictor or hint bits within the branch instruction. Another predictor (e.g., a gskew predictor) makes predictions, but rather than predicting taken/not-taken, the predictor predicts agree/disagree with the base prediction. The intention is that if branches covered by the gskew predictor tend to be a bit biased in one direction, perhaps 70%/30%, then all those biases can be aligned so that the gskew pattern history table will tend to have more agree entries than disagree entries. This reduces the likelihood that two aliasing branches would best have opposite values in the prediction history table (PHT).

Agree predictors work well with combined predictors, because the combined predictor usually has a predictor which can be used as the base for the agree predictor. Agree predictors do less well with branches that are not biased in one direction, if that causes the base predictor to give changing predictions. So an agree predictor may work best as part of a three-predictor scheme, with one agree predictor and another non-agree type predictor.

Almost all pipelined processors do branch prediction of some form, because they must guess the address of the next instruction to fetch before the current instruction has been executed. Key parameters in designing branch prediction techniques are the number of branch prediction entries, and the branch prediction algorithm, such as single bit predictors, or saturating n-bit predictors. These decisions have to be applied to a variety of branch prediction methods, for local or global predictors.

While the prior art has allowed a combination of a variety of predictors, a key decision for microprocessor designers has been the choice of branch prediction algorithms. In accordance with prior art, with a fixed memory allocation of k bits, designers have had the ability to implement each prediction table to have either k single bit predictors, or k/2 bimodal predictors, or more generally, k/n predictors with n bit counters. This represents a tradeoff between offering predictors which permit improvement in quality of single predictions by using more bits for each prediction, or to offer more simply structured predictors. In another tradeoff, designers have the possibility to opt for longer latency local predictors, or short latency bimodal or single bit predictors.

The best prediction quality depends on a variety of factors, such as workload-specific properties, which may differ for different programs, or between programs. Thus, while the state of the art has permitted the combination of predictors, it has not permitted optimization of the prediction to a specific application, or even phase within an application. Instead, structure (such as tournament predictors), the use of global or local prediction, and the choice of 1 bit or bimodal predictors had to be fixed at design time, requiring an implementer to select a specific configuration once and the configuration was to be used for all applications.

While predictor design has permitted good average performance, the prior art has not been able to optimize predictors for specific applications.

SUMMARY

Methods and apparatus are disclosed herein for implementing polymorphic branch predictors which can be configured at application execution time to select at least one of a structure or algorithm to a specific application.

A polymorphic branch predictor and method includes a plurality of branch prediction methods. The methods are selectively enabled to perform branch prediction. A selection mechanism is configured to select one or more of the branch prediction methods in accordance with a dynamic setting to optimize performance of the branch predictor during operation in accordance with a current task.

A polymorphic branch predictor includes a plurality of branch prediction methods, each method being selectively enabled to perform branch prediction. A selection mechanism configured to select one or more of the branch prediction methods in accordance with a dynamic setting to optimize performance of the branch predictor during operation in accordance with a current task.

In alternate embodiments, the polymorphic branch predictor setting may include a performance metric. The selection mechanism may be configured to select at least two branch prediction methods to work together to provide a result. The selection mechanism may select the one or more branch prediction methods for a specific application or set of applications as designated in advance or based upon an analysis of runtime behavior.

In still other embodiments, the selection mechanism may be configured to receive information from one of a compiler, and a runtime component to select the one or more branch prediction methods. The selection mechanism may be configured to be updated during runtime of an application or configured to be updated based upon at least one of output from a logic function, an address bit, a thread specifier and a hash of several address or thread bits.

The polymorphic branch predictor may further comprise an array of predictor entries wherein the predictor entries stored in the array are configured with respect to a number and bits of information, a per-bit write enable signal or a multi-bit write enable signal to permit a write operation to the array.

Each branch prediction method may include logic elements such that the logic elements are shared between the branch prediction methods for efficiency. The logic elements shared between branch prediction methods may include at least one of arrays, predictor update logic, and address generation logic. The polymorphic branch predictor may include an array of predictor entries and a branch information queue wherein information is used from the branch information queue to re-write previously read information from the array. The polymorphic branch predictor may include addressing logic configured to be shared between a unified table and a table of a multi-component predictor. Multiple component arrays of predictor entries may be provided where predictor entries are selected by address bits or by address hashing to select one of the multiple component arrays.

A method for dynamically selecting a branch prediction method includes providing a plurality of branch prediction methods which are dynamically configurable, selecting one or more of the branch prediction methods in accordance with a dynamic setting to optimize performance of the branch predictor during operation in accordance with a current task, and updating a configuration of the one or more branch prediction methods to provide improved prediction results.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
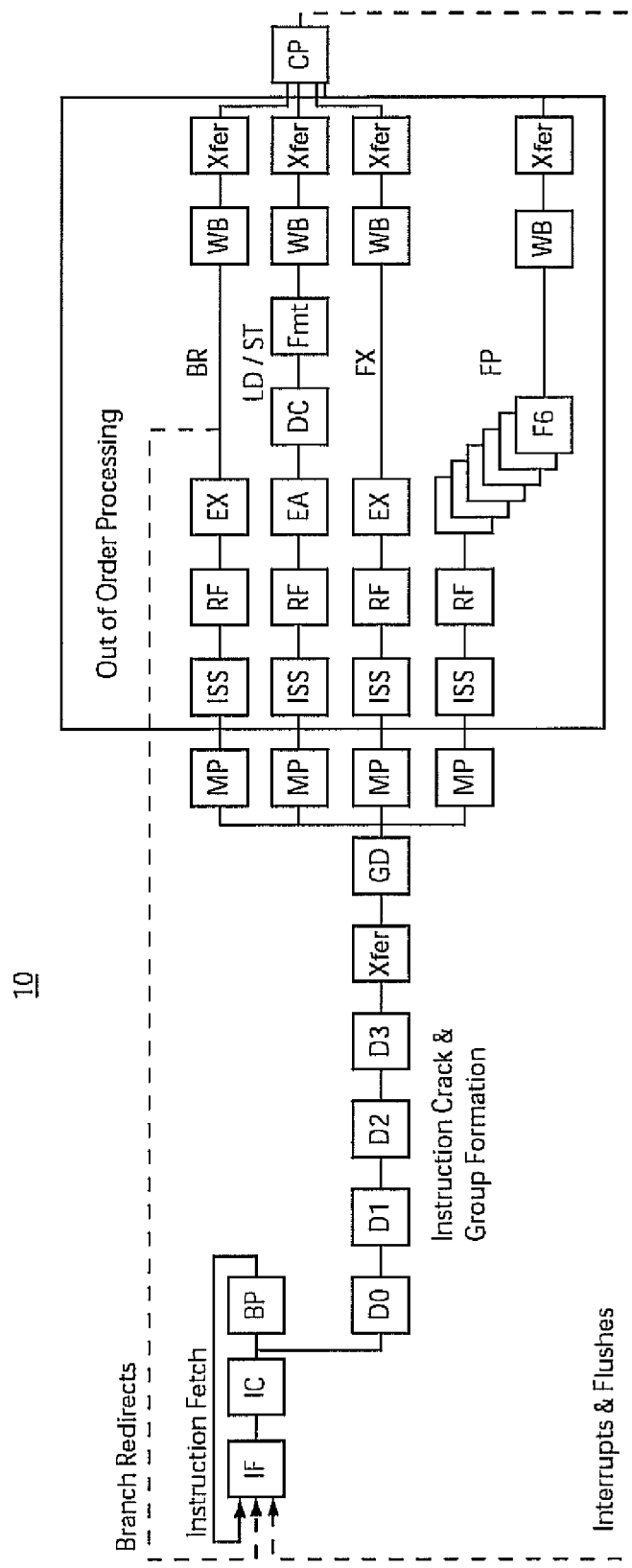
FIG. 1 shows an exemplary pipeline diagram including a branch predictor which may be employed in accordance with the present invention.

Embodiments of the present invention are directed to implementing polymorphic branch predictors, and their use and selection by software. Embodiments of the present invention can take the form of an entirely hardware embodiment, an entirely software embodiment or an embodiment including both hardware and software elements. In a preferred embodiment, a polymorphic predictor is implemented as an integrated circuit. Configuration selection may be implemented in software, which includes but is not limited to microcode, firmware, resident software, hypervisors, operating systems, system tools, application programs, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The polymorphic branch predictors as described herein may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, an exemplary high-performance microprocessor pipeline 10 is illustratively shown which may employ branch prediction in accordance with processors implementing the present invention. Instructions are fetched using instruction fetch logic IF from the instruction cache IC. The instructions are processed by branch prediction logic BP, as well as passed to decoding logic D0, D1, D2, D3. Branch prediction can effect a change in fetch direction by updating the instruction fetch address maintained in instruction fetch logic IF, if a predicted-taken branch is encountered.

Decoded instructions (both branch instructions and non-branch instructions) are transferred via transfer facility XFER to dispatch logic GD. Individual instructions being dispatched are renamed using register map table MP, and entered into issue queues maintained in issue logic ISS, depending on instruction type, to issue to the appropriate execution pipelines BR, LD/ST, FX, and FP. Instructions are issued out of order with respect to each other from issue queues maintained in issue logic, by issue logic ISS.

Referring now to the execution in compute pipelines LD/ST, FX, and FP, instructions perform register file access to one or more register files RF, and enter an execution phase. For LD/ST instructions, the execution phase includes a first address generation phase EA, followed by data cache access and data formatting. For FX instructions, execution includes a logic function implemented by EX. For FP instructions, execution includes one or more logic functions F1 to F6. Referring now to the execution of branch instructions in a BR pipeline, branch instructions optionally perform one or more register file accesses to retrieve one or more of condition, branch counter, and branch target operands in register file access logic RF. Branch execution logic EX in the BR pipeline computes the target address and branch condition, and compares with the predicted target and condition. If a misprediction is detected, e.g., either the condition was computed incorrectly, or the wrong target was supplied, a branch redirection action is taken. Mispredicted instructions are removed from execution pipelines using a flush or other appropriate mechanism, and the fetch address maintained in instruction fetch logic IF is updated.

All execution pipelines compete by performing a writeback WB of computed results, and a transfer XFER to a commit stage CP.

Instructions are committed at their in-order commit point by commit stage CP in-order relative to all other instructions. Interrupt conditions, exceptions, and other special execution conditions cause a flush and refetch to be effected by commit stage, setting the instruction fetch address in instruction fetch logic IF to one of a re-execution or an interrupt or exception handler address.

Figure 2A:
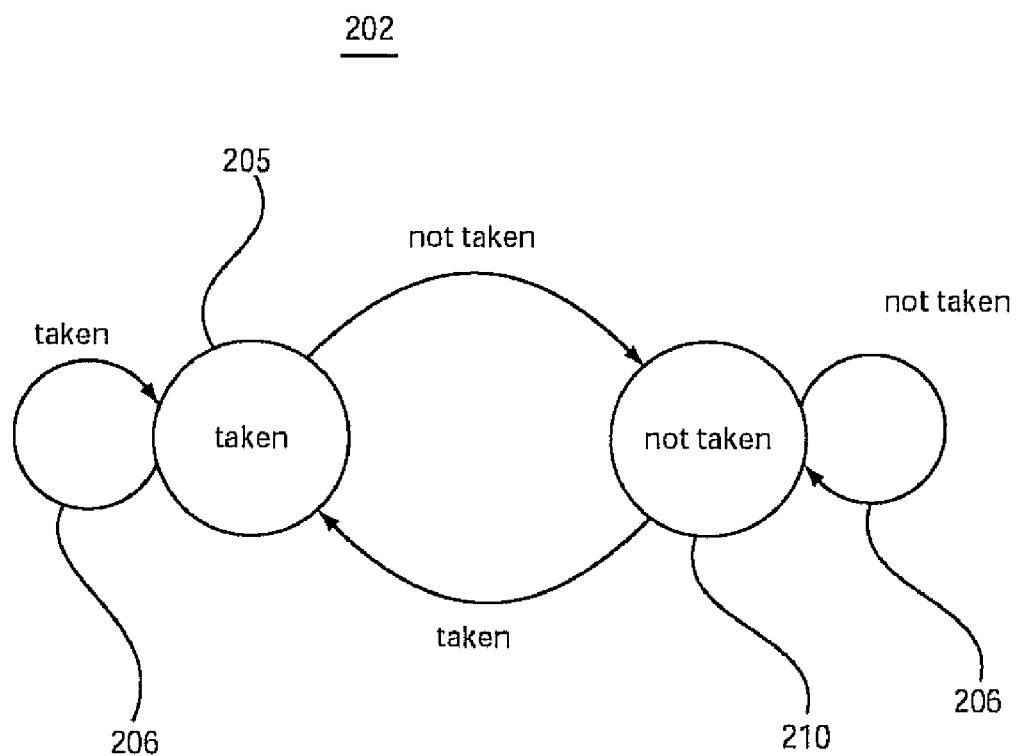
FIGS. 2A and 2B respectively show single bit predictor states and bimodal predictor states.
Figure 2B:
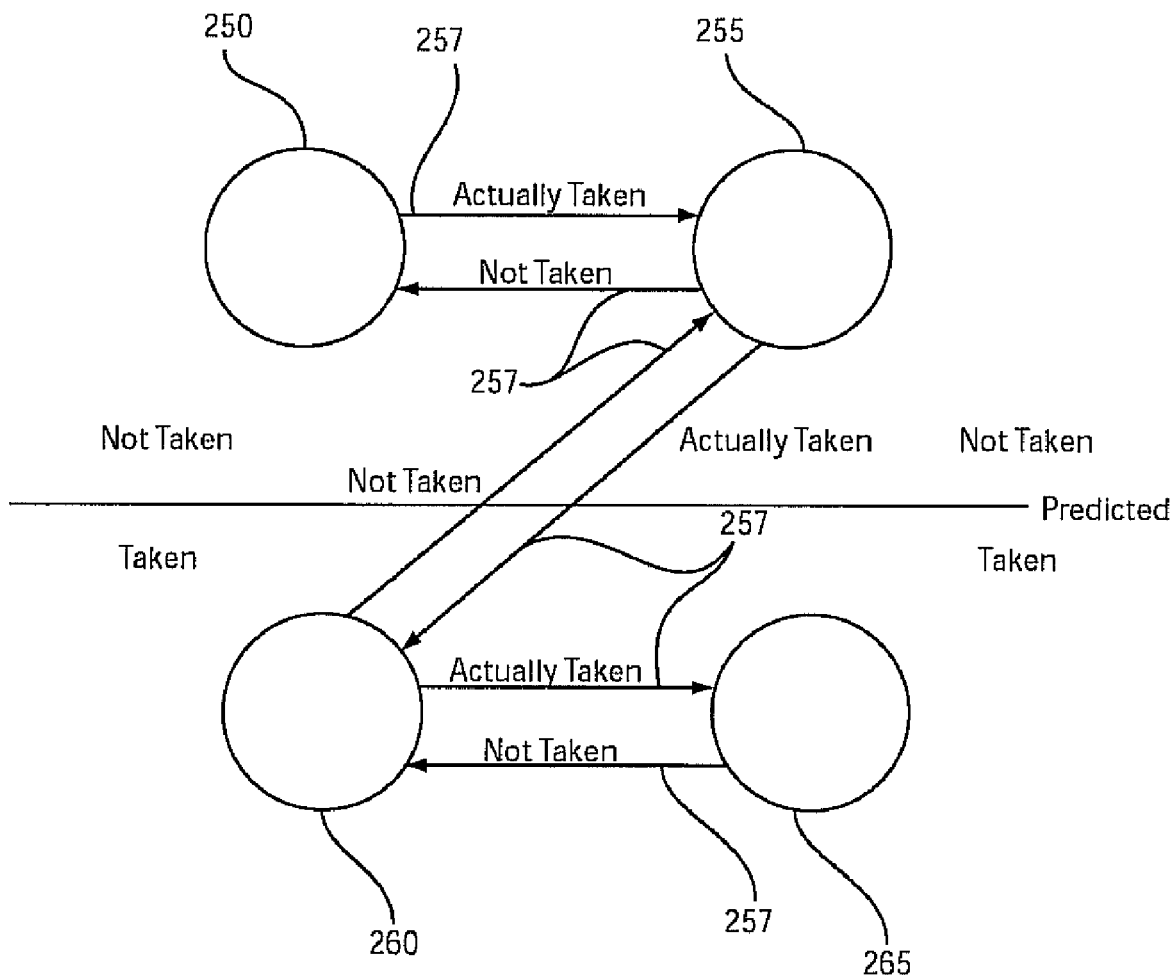

Referring to FIGS. 2A and 2B, there is shown two exemplary branch predictor entry types. Each predictor is associated with a particular branch with the association being the result of using branch address, gshare, gselect, or local predictor. When a predictor is retrieved under the control of a selection and association mechanism, the predictors state is identified, and based on the state a prediction is made.

Referring now more specifically to FIG. 2A, a single bit predictor 202 using a single information bit to represent one of two states (taken 205 and not taken 210), corresponding to the next prediction to be made. If a predictor is in the taken state 205, a prediction returns an indication that the branch will be taken. If a predictor is in the not taken state 210, a prediction returns an indication that the branch will be not taken. When the prediction is checked during branch execution in an exemplary BR pipeline, a misprediction will cause a state transition, e.g., the prediction will be changed to reflect the direction of the last branch outcome, as indicated by state transition arcs 206 labeled with the branch outcome.

Referring to FIG. 2B, an exemplary bi-modal predictor using two information bits to represent one of four states, corresponding to the next prediction to be made is illustratively shown. The four states include strongly not taken 250, weakly not taken 255, weakly not taken 260, strongly not taken 265. If a predictor is in one of two "taken" states 250 and 255, a prediction returns an indication that the branch will be taken. If a predictor is in one of two "not taken" states, a prediction returns an indication that the branch will be not taken. When the prediction is checked during branch execution in an exemplary BR pipeline, state transitions are performed in accordance with FIG. 2B. Specifically, a correct prediction will cause selection of the "strong" state of the appropriate direction. If a misprediction is detected, a predictor update will be performed to the weak state 255 or 260, if the predictor was previously in a strong state 250 or 265, respectively. The prediction direction will be changed between states 255 and 260 if the predictor was in a weak state, as shown by transition arcs 257 of FIG. 2B labeled with the branch outcomes.

Figure 3:
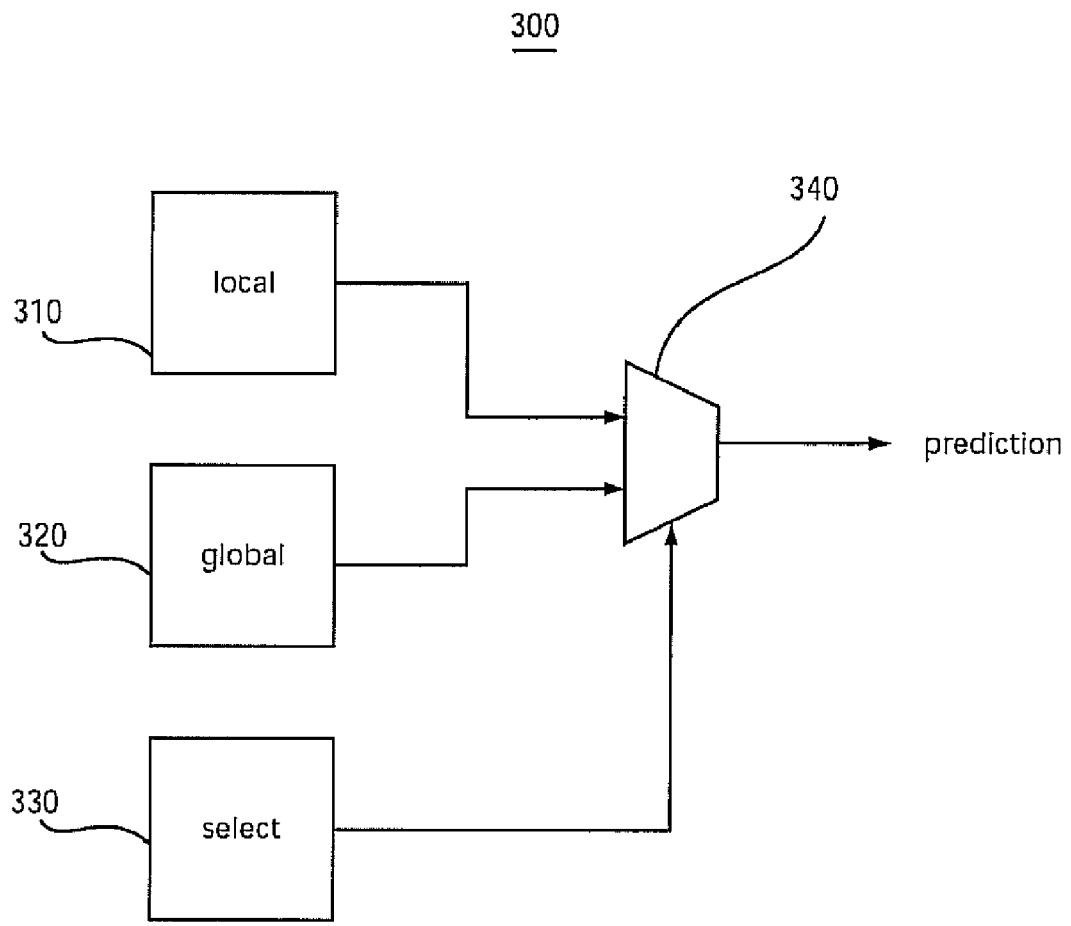
FIG. 3 shows an illustrative tournament predictor.

Referring to FIG. 3, there is shown an exemplary tournament predictor 300, including three exemplary component predictors, e.g., a local predictor 310, a global predictor 320, and a select predictor 330. A selection mechanism 340 selects a prediction made by one of the local predictor 310 and the global predictor 320 under control of the select predictor 330.

Figure 4:
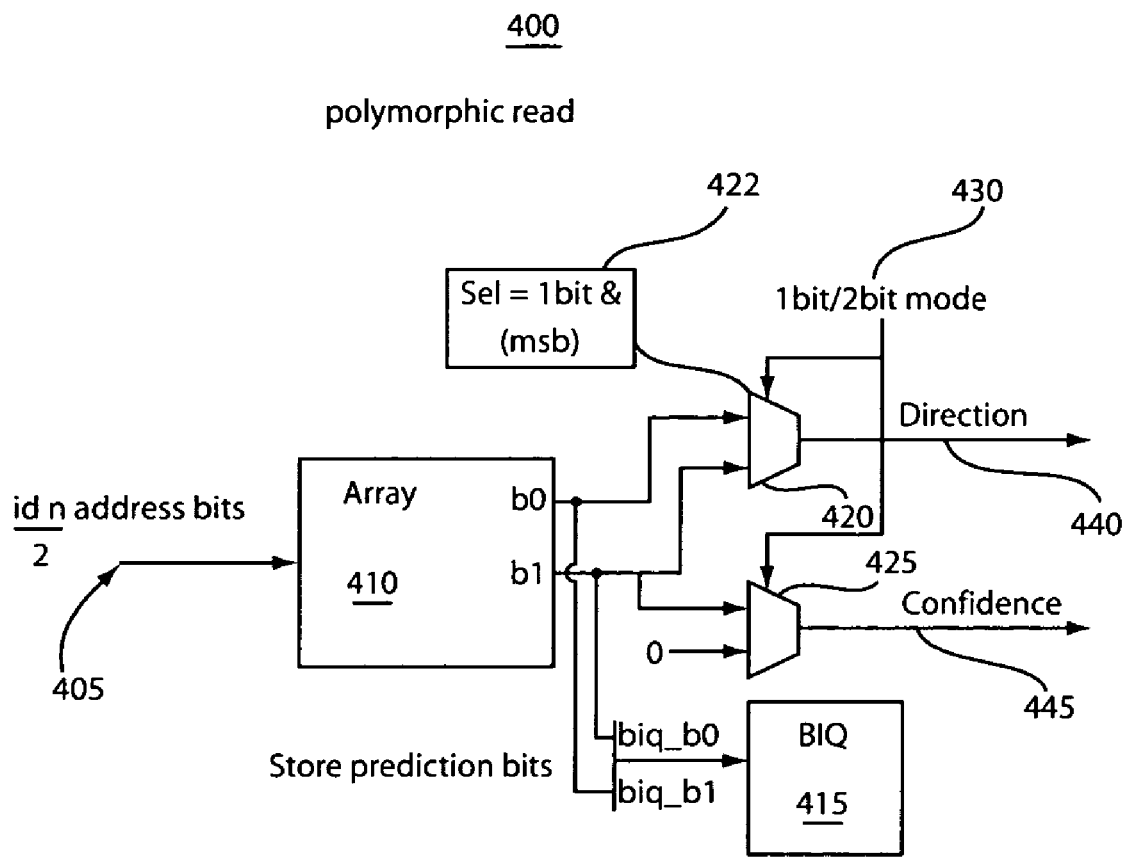
FIG. 4 shows read-access to a polymorphic predictor with a single bit and bimodal branch predictor modes with a branch information queue in accordance with an illustrative embodiment.

Referring to FIG. 4, implementation aspects of a polymorphic branch predictor 400 under control of a mode control selection mechanism 430 (e.g., "1 bit/2 bit mode") are illustratively shown. The control selection mechanism 430 employs either a first mode using the predictor 400 as a 1 bit predictor with n entries, or a second mode using the predictor 400 as a 2 bit predictor with a reduced number of entries (e.g., n/2 entries) in a prediction array 410.

In accordance with a preferred embodiment, the array 410 uses (1d n)/2 address bits at input 405 to address a single entry having 2 bits for read-out of array 410. In accordance with one implementation of a branch predictor, branch prediction bits, e.g., b0 and b1 retrieved from array 410 are stored in a branch information queue BIQ 415 as biq_b0 and biq_b1 for use by a BR execution pipeline.

Predictions may be made based upon the 2 bit information retrieved, in a first mode of operation, a 2 bit predictor is implemented, and the 2 bits are provided as direction and confidence outputs 440 and 445, respectively, under control of selection elements 420 and 425. The selection elements 420 and 425 are configured under control of polymorphic configuration information 430. In a second mode of operation, predictor 400 operates as a provider of single bit predictions. A selection mechanism 420 selects, under the control of polymorphic configuration information 430, one of the two bits provided by array 410 as the single bit directional prediction output 440.

In accordance with one implementation of the polymorphic predictor 400, a selection is implemented on an additional predictor address bit (e.g., address bit 422) as follows. Direction 440 becomes b0 when in 2 bit mode or address 422 equals 0. Otherwise, direction 440 is equal to b1. Using standardized VHDL notation to describe this condition but allowing symbolic names to describe conditions and signals corresponding to aspects of the teachings included herein, the logic operation may be stated as:

D_Out<=bit0 when (mode=2 bit OR address_bit='0') else bit1.

where address_bit is indicated as, e.g., "msb" in the FIGS. (for the most significant bit, which is one possible bit which may be selected).

In accordance with one implementation, a single bit predictor can be formatted as a bimodal predictor for shared processing in a common dataflow by optionally resetting a confidence bit to a 'weak' state for single bit predictors. This may include having confidence 445 become b1 when in 2 bit mode and 0 otherwise. Using standardized VHDL notation to describe this condition but allowing symbolic names to describe conditions and signals corresponding to aspects of the teachings included herein, the logic may be stated as:

C_Out<=bit1 when (mode=2 bit) else '0'.

This illustrative embodiment is exemplary and non-limiting. Those skilled in the art will understand that other mechanisms can be used to select one of two bits when implementing a single bit predictor (e.g., a thread specifier can be used in lieu of an address bit), a variety of different address bits can be used, such as including, but not limited to, a least significant bit, a most significant bit, a hash of several address bits, thread bits, and so forth. Those skilled in the art will also understand that polymorphic branch prediction may be maintained on a per-thread basis, permitting one thread to use a predictor as a single bit predictor, whereas another concurrently executing application may use storage elements and logic to perform 2-bit predictions.

In at least one embodiment, multiple predictions for multiple branches are retrieved simultaneously, either from a single array with a wide read port, or using multiple parallel copies of predictor arrays. In those embodiments, the number of address bits will be suitably adapted and/or reduced to reflect the number of bits concurrently retrieved from predictor storage. In another embodiment, different bit widths are selected, permitting support of first and second predictors of bit widths other than the exemplary 1-bit and 2-bit predictors. In yet another embodiment, each of the two bits is retrieved from a separate array, permitting de-energizing one of the arrays under control of a predictor address bit, or other such bit as may be used to control selection logic 420.

Figure 5A:
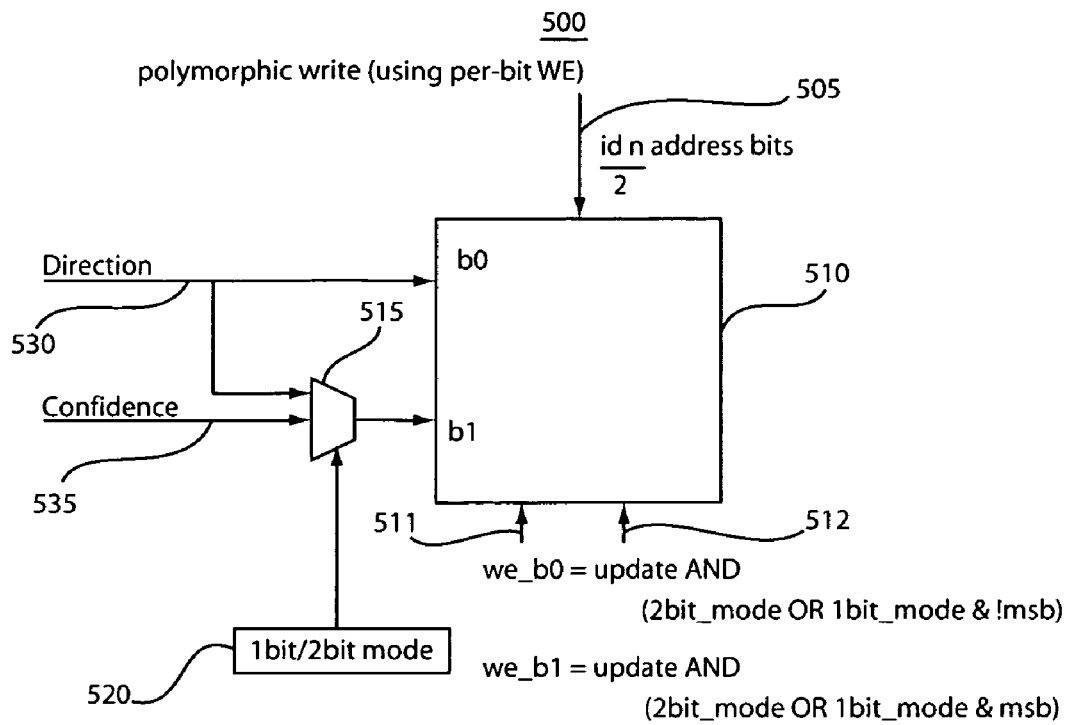
FIG. 5A shows an implementation for updating a polymorphic 1-bit/bimodal predictor using a memory array having the ability to write-update a single storage bit in accordance with an illustrative embodiment.
Figure 5B:
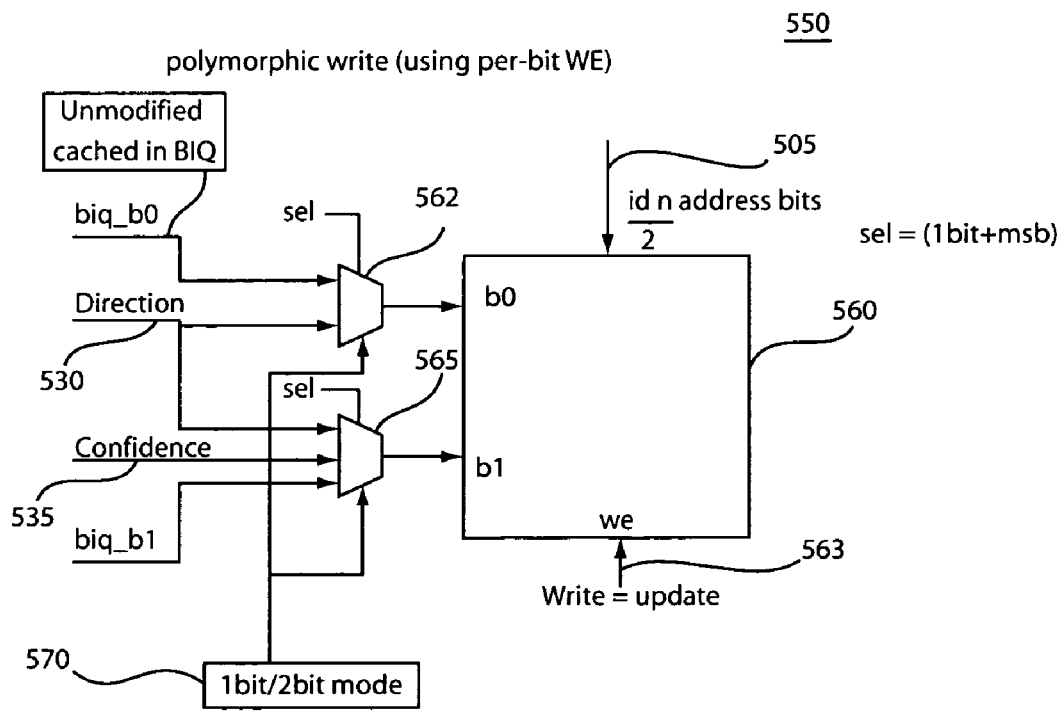
FIG. 5B shows an implementation for updating a polymorphic 1-bit/bimodal predictor using a memory array having the ability to write-update entries with dual bits in accordance with an illustrative embodiment.

Referring to FIGS. 5A and 5B, implementations for performing write operations to a predictor storage array 510 in accordance with a polymorphic prediction mechanism is illustratively shown. In FIG. 5A, a predictor memory write to a predictor storage array 510 is illustratively shown supporting the concurrent storage of two bits (b0 and b1), and having separate write-enable facilities for each bit. In accordance with this facility, storage array 510 receives, an address with (1 d n)/2 address bits at input 505, a first data bit b0 and second data bit b1, and a first and second write enable signals, we_b0 511 and we_b1 512, corresponding to writing a first bit b0 and a second bit b1 of the entry specified by the address.

In accordance with this exemplary embodiment, either a 1 bit predictor update can be made, or a two bit predictor update can be made by employing selection mechanism 520. For a first mode of operation for performing a two bit predictor update, a direction value 530 is supplied to bit b0, and a confidence value 535 is supplied to bit b1 under control of polymorphic configuration information 520. In addition, both write-enable signals, we_b0 511 and we_b1 512, are selected to update both bit b0 and bit b1. In a second mode of operation for performing a single bit predictor update, a direction value 530 is written to one of bit b0 and b1, under control of selection logic 515, and one of write enables we_b0 511 and we_b1 512.

In one exemplary embodiment, the bits are computed as follows (using the standardized VHDL notation):

b0<=direction;
b1<=confidence when (mode=2 bit) else direction;
we_b0<=2_bit_update when (mode=2 bit) else 1_bit_update and address_bit='0';
we_b1<=2_bit_update when (mode=2 bit) else 1_bit_update and address_bit='1';

Referring to FIG. 5B, a predictor memory write to a predictor storage array 560 is illustratively shown supporting the concurrent storage of two bits, and having a common write-enable facility for both bits. In accordance with this facility, a storage array 560 receives, an address with (1 d n)/2 address bits at input 505, a first and second data bit b0 and b1, and a single write enable, we 563, corresponding to writing both bits of the entry specified by the address. In accordance with this exemplary embodiment, either a 1 bit predictor update can be made, or a two bit predictor update can be made.

In a first mode of operation for performing a two bit predictor update, a direction value 530 is supplied to bit b0, and a confidence value 535 to bit b1 under control of polymorphic configuration information 570 and selection logic 562 and 565 controlled by a select (sel) signal. In addition, write-enable signal, we 563, is selected to update the address entry with direction 530 and confidence 535 information. In a second mode of operation for performing a single bit predictor update, a direction value 530 is written to one of bit b0 and b1, under control of selection logic 562, and information (biq_b0 and biq_b1) about the original entry contents (the information having been stored in an exemplary branch information queue BIQ 415) is used to re-store previous information, under control of a selector bit (sel) and logic 562 and 565, and polymorphic configuration information 570. In one exemplary embodiment, the bits are computed as follows (using the standardized VHDL notation):

b0<=direction when (mode=2 bit OR address_bit='0') else biq_b0;
b1<=confidence when (mode=2 bit) else direction when (address_bit='1') else biq_b1;
we<=2_bit_update when (mode=2 bit) else 1_bit_update;

Those skilled in the art will understand that the embodiment depicted in FIG. 5B trades off higher storage density in the array 560, for false dependencies leading to the overwriting of a predictor update which may have occurred between the time the BIQ information was retrieved, and the re-storing of the retrieved information. Those skilled in the art will further understand the ability to provide associative bypass of one or more recently updated values to reduce or eliminate the impact of such false-dependence updating. FIGS. 5A and 5B are exemplary, and non-limiting. Those skilled in the art will understand that other mechanisms can be used to select one of two bits when implementing a single bit predictor (e.g., a thread specifier can be used in lieu of an address bit), a variety of different address bits can be used, such as including, but not limited to, a least significant bit, a most significant bit, a hash of several address bits, thread bits, and so forth. Those skilled in the art will also understand that polymorphic branch prediction may be maintained on a per-thread basis, permitting one thread to use a predictor as a single bit predictor, whereas another concurrently executing application may use storage elements and logic to perform 2-bit predictions.

Figure 6:
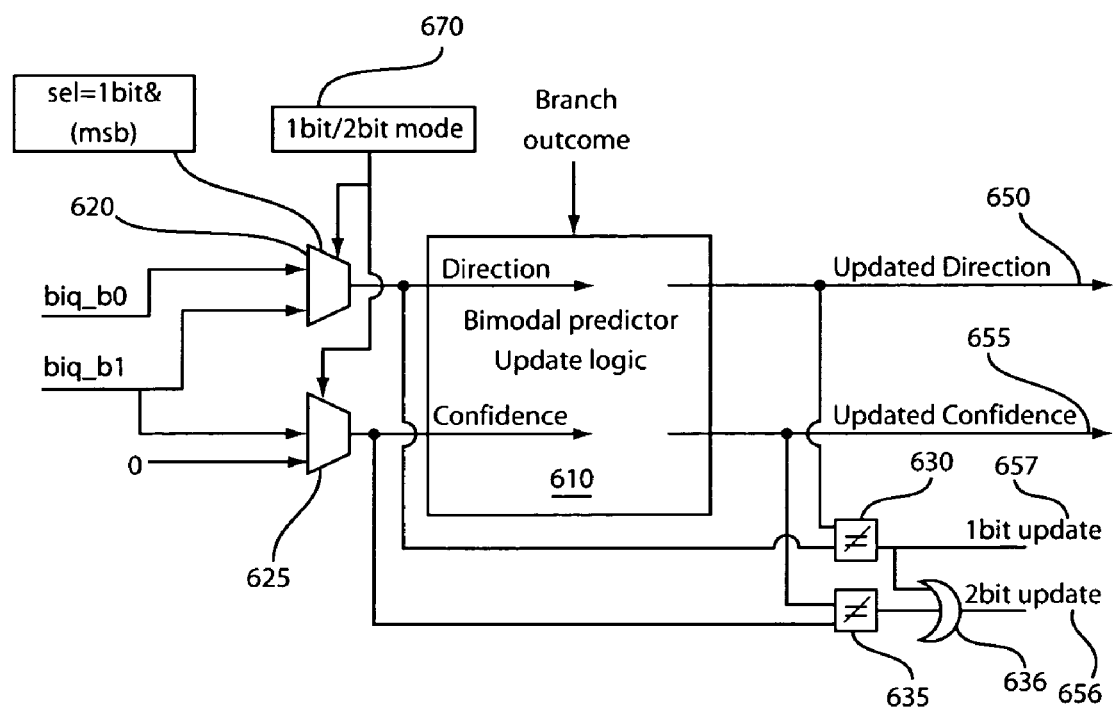
FIG. 6 is a schematic diagram of a circuit for sharing of a predictor for making single bit and n bit predictions in accordance with an illustrative embodiment.

Referring to FIG. 6, an implementation of a low-overhead polymorphic predictor is shown wherein support of polymorphic functionality does not significantly increase logic complexity. It is therefore desirable to use common logic functionality for the implementation of prediction update logic for all configurable polymorphic modes. In accordance with a novel polymorphic predictor, branch prediction update logic 600 is shown, which is used to update both a single bit or a 2 bit (bimodal) predictor, in accordance with the present invention. There are provided contents of the branch information queue BIQ 415, such as biq_b0 and biq_b1, and a "branch outcome" as computed by logic EX of BR the execution pipeline of an exemplary microprocessor as shown in FIG. 1. In accordance with the present invention, polymorphic predictor update provides updated direction information 650, updated confidence information 655, and indications whether a 1 bit (657) or a 2 bit (bimodal) (656) predictor should be updated in predictor storage.

Specifically, the logic for computing a branch prediction 610 corresponds to the unmodified functionality of a bimodal predictor (2 bit predictor) of FIG. 2B. In accordance with the embodiment of FIG. 6, in a first mode of operation there is computed a 2 bit prediction update 656 result in accordance with FIG. 2B, under control of polymorphic configuration 670, providing updated direction 650, confidence information 655, and updated information 656 whether to update the two bit predictor in predictor storage. In a second mode of operation, a single bit prediction result in accordance with FIG. 2A, providing updated direction 650 and update information 657 whether to update the two bit predictor in predictor storage is provided. START In one exemplary embodiment, the updates are computed as follows (using the standardized VHDL notation):
b0<=biq_b0 when (mode=2 bit OR address_bit='0') else biq_b1;
b1<=biq_b1 when (mode=2 bit) else '';
1_bit_update<=b0/=direction;
2_bit_update<=b0/=direction OR b1/=confidence.

The logic and operations depicted in FIG. 6 are non-limiting, other types of predictor update sharing can be practiced in accordance with the teachings herein. Widths, functions are other modifications may be employed. Those skilled in the art will find logic optimizations and transformations, to reduce logic cone size and depth, and so forth, for specific technologies and using generally known transformations. These have been omitted for simplicity.

Figure 7A:
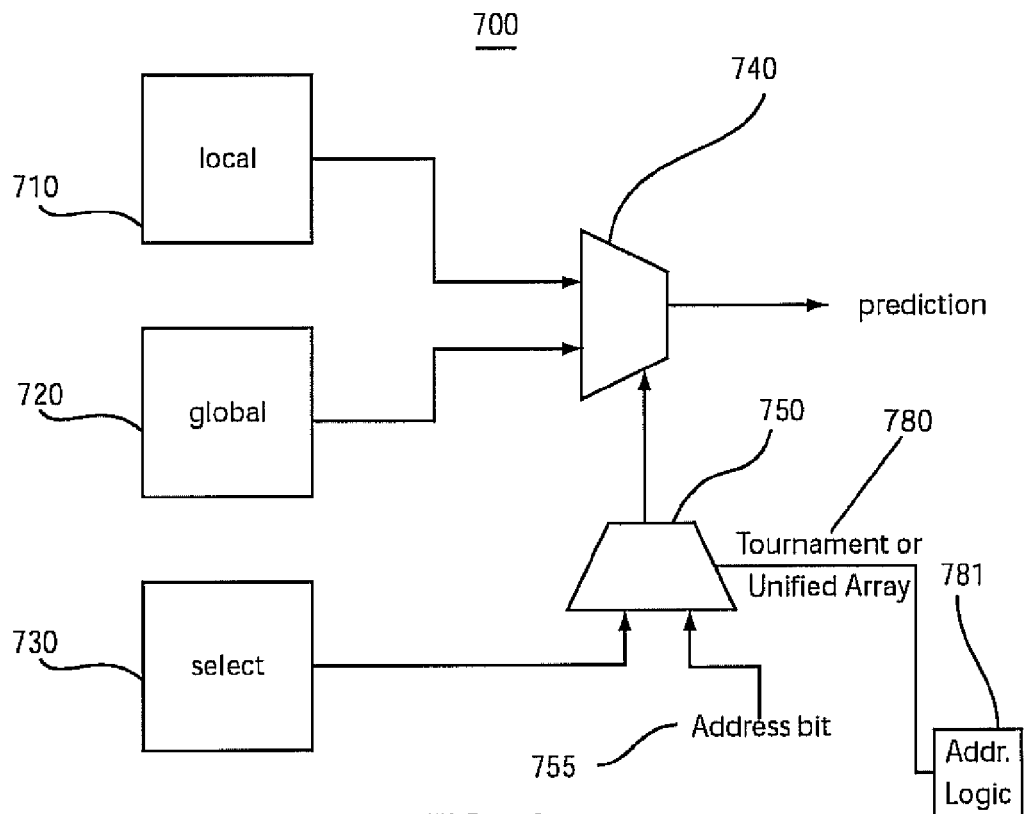
FIG. 7A is a schematic diagram showing a read path for a polymorphic branch predictor configurable to implement either a single unified large predictor or a tournament predictor in accordance with an illustrative embodiment.
Figure 7B:
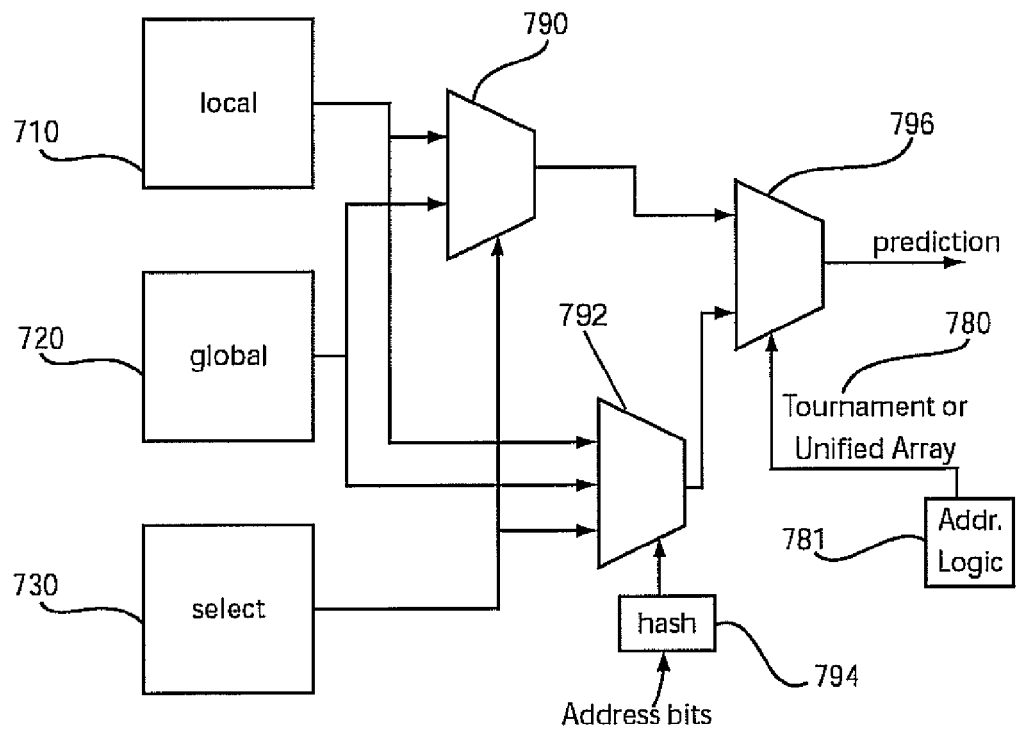
FIG. 7B is a schematic diagram showing another read path for a polymorphic branch predictor configurable to implement either a single unified large predictor or a tournament predictor in accordance with an illustrative embodiment.

Referring now to FIGS. 7A and 7B, methods for polymorphically configuring predictors with respect to their organization structure are shown. These methods are shown in an exemplary fashion, being configurable to implement either a single level unified predictor, or a tournament predictor. Each of predictors 710, 720, 730 may be further configurable in accordance with the teachings presented in FIGS. 4, 5A, and 5B with respect to the storage and operation of a predictor entry.

Referring to FIG. 7A, a first exemplary reading method and apparatus for a polymorphic predictor is illustratively shown including being one of a unified large single predictor, or a tournament predictor. In accordance with this exemplary embodiment, polymorphic configuration information 780 from addressing logic 781 is used to control the configuration as a tournament predictor or a unified array predictor. The tournament predictor constitutes multiple arrays of a first size (or first multiple sizes). A single large unified array corresponds to a single predictor with a larger number of entries.

In accordance with a first mode of operation, the exemplary embodiment operates as tournament predictor under control of a selector 750 under control of configuration information 780 selecting a selection source for a selector 740. Selection logic 740 is configured to select one of multiple predictions of exemplary component predictors 710 and 720 under control of a selection predictor 730. In accordance with a second mode of operation, the exemplary embodiment operates as a single large unified predictor under control of selector 750 under control of configuration information 780 selecting a selection source using selector 740. Selection logic 740 is configured to select one of multiple sub-array results under control of input 755 which may include one of an address bit, a hashed address bit, a thread bit, or other appropriate addressing means.

Referring now to FIG. 7B, there is shown a second exemplary reading method and apparatus of a polymorphic predictor with respect to being one of a unified large single predictor, or a tournament predictor. In accordance with this exemplary embodiment, polymorphic configuration information 780 is used to control the configuration as a tournament predictor including multiple arrays of a first size (or first multiple sizes) or a single large unified array corresponding to a single predictor with a larger number of entries.

In accordance with a first mode of operation, the exemplary embodiment operates as a tournament predictor. Selector 790 selects the prediction of from one of two exemplary component predictors 710 and 720. A selector 796 selects the result of tournament prediction generated by selector 790 under control of configuration 780. In accordance with a second mode of operation, the exemplary embodiment operates as a single large unified predictor, using selector 792 under the control of an address generated by hash logic 794. In this exemplary logic 794, a hash function of one and more address bits is used to distribute usage across the multiple arrays. Specifically, as the number of arrays is not a power of 2, it is impossible to directly use address bits without creating imbalanced use of component arrays when using the component arrays as subarrays for a larger logical array. Selector 796 selects the result of the prediction generated by the subarray selector 792 under control of configuration 780.

In the exemplary logic, a hash function 794 of one and more address bits is used to distribute usage across the multiple arrays. Those skilled in the art will understand that alternate ways of selecting subarrays may be employed, e.g., by using a variety of selection sources, concatenating bit strings, using logic functions of a variety of bits, etc., which may be used to select subarrays in accordance with the present invention.

In yet another embodiment, a first component table is used to generate a first bit (such as a direction prediction bit), and a second bit (such as a confidence bit), to represent a predictor operating as a multi-component predictor, e.g., using single bit predictor entries, in a first mode of operation, and a single unified predictor, using multi-bit predictor entries (e.g., bimodal predictors), in a second mode of operation, within the scope of the present invention. Those skilled in the art will understand that based on the scope of the teachings herein, another configuration opportunity is to reconfigure a first tournament predictor with n component tables into a predictor with logical k component tables, k<n, wherein at least on of said k component tables corresponds to a combination of at least two arrays from the n component tables. Component tables are known in the art.

The use of a tournament predictor in the example configuration of multi-component table predictors is exemplary and not limiting. Those skilled in the art will further understand that selective clock gating can be performed on one or more of the component arrays when the component array are non-selected by a selector, subject to timing constraints of clock gating logic.

Figure 8:
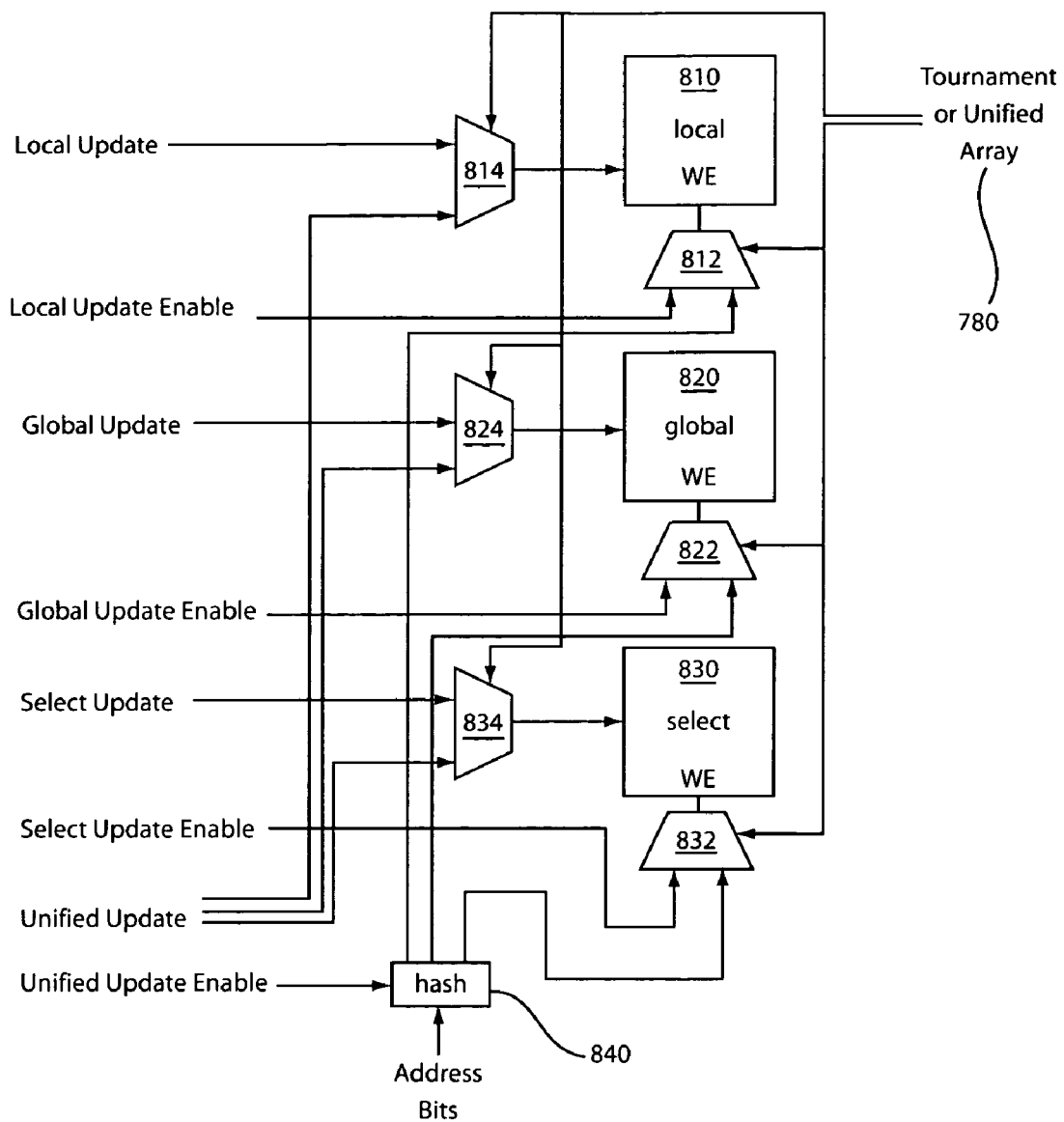
FIG. 8 is a schematic diagram showing a write-update path for an exemplary polymorphic predictor configurable as a tournament or unified array in accordance with another illustrative embodiment.

Referring now to FIG. 8, predictor update logic 850 is shown for a polymorphic predictor permitting configuration as either a multi-component predictor (such as an exemplary tournament predictor), or a single unified predictor, corresponding to polymorphic read logic in FIGS. 7A and 7B. Predictor 850 includes three component predictor tables, 810, 820 and 830.

In a first mode of operation, one or more component predictors of a multi-component predictor 850 are updated in accordance with an update specification for a multi-component predictor, under the control of polymorphic configuration 780. If an update enable for a first predictor array 810 is indicated (in an exemplary use of a local predictor array), a local prediction update (local update) is selected under control of polymorphic configuration 780 by selector 814, and the local prediction update enable (local update enable) is selected by selector 812. If an update enable for a second predictor array 820 is indicated (in an exemplary use of a global predictor array), the global prediction update (global update) is selected under control of polymorphic configuration 780 by selector 824, and a global prediction update enable (global update enable) is selected by selector 822. If an update enable for a third predictor array 820 is indicated (in an exemplary use of a select predictor array), a select prediction update (select update) is selected under control of polymorphic configuration 780 by selector 834, and the select prediction update enable (select update enable) is selected by selector 832.

In a second mode of operation, at least two arrays 810, 820 and 830 are combined for use as a single large array. In accordance with a preferred embodiment, one or more hash functions 840 are computed (e.g., corresponding to hash functions 794 in FIG. 7B) and combined with an update enable for the large predictor configuration, to select at least one subarray for updating an entry in a large logical predictor array.

In the second mode of operation, selectors 814, 824, 834 select the predictor update from a common large predictor entry update under control of polymorphic configuration information 780, and selectors 812, 822, 832 select array write enable information based on the generated hash function and update enable. Those skilled in the art will understand that in addition to address bits in hash block, additional information, such as, e.g., thread bits, etc. may be used. Furthermore, within the scope of the present invention, a subset of bits may be used in lieu of a hash of bits (and in accordance with the read embodiment of FIG. 7A).

Figure 9:
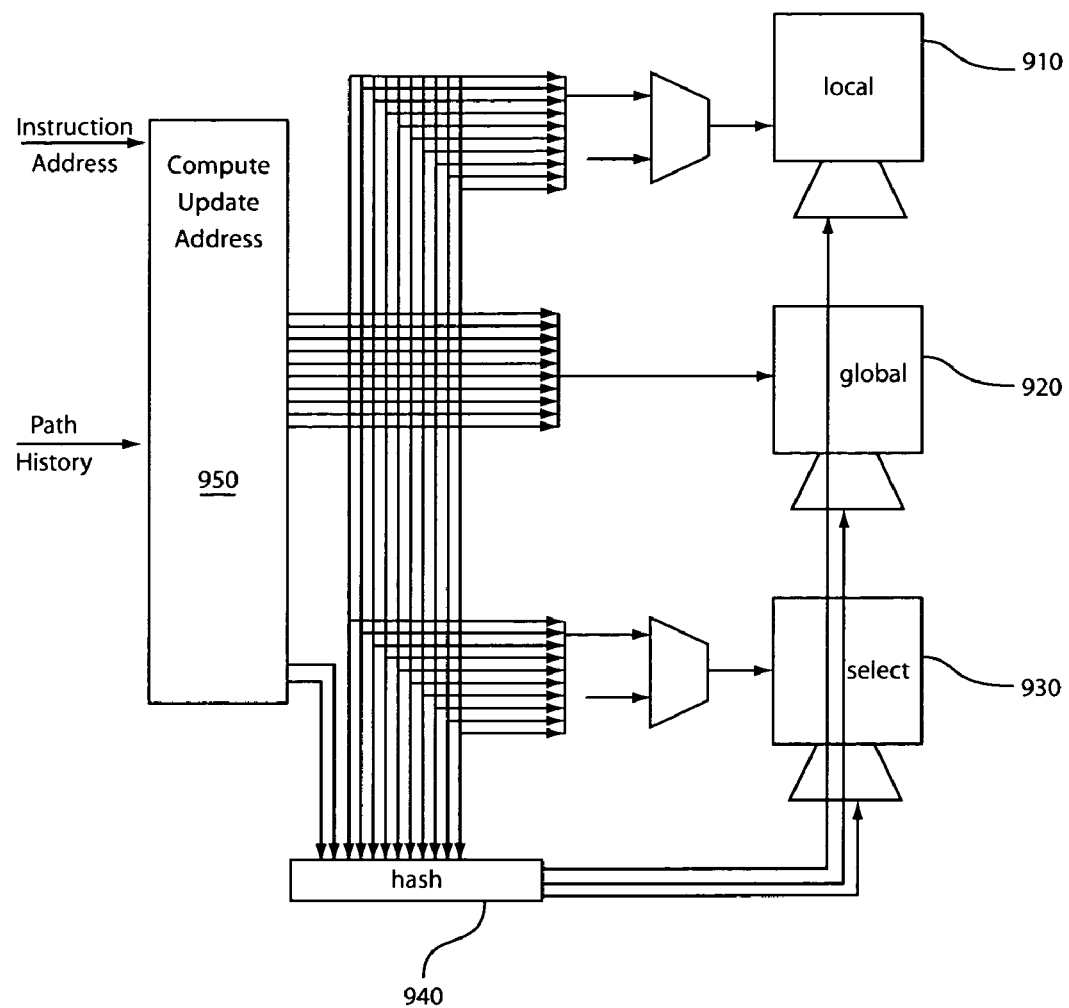
FIG. 9 is a schematic diagram showing the sharing of update logic for tournament/non-tournament branch prediction in accordance with an illustrative embodiment.

Referring to FIG. 9, an exemplary embodiment having shared update address computation logic is illustratively shown with respect to a first and second mode of operation of a polymorphic predictor in accordance with FIGS. 7A, 7B, and 8. In accordance with this embodiment, update address computation logic 950 is used to compute both an address for a global predictor 920 in a multi-component predictor in a first mode of operation, or an update address for a unified predictor with a single larger array, by providing additional address bits. The address bits are also used also to select one or more subarrays 910, 920, 930 of a single logical array predictor under control of hash logic 940 (generally corresponding to hash function 840 of FIG. 8).

The polymorphic branch predictor may include logic elements (e.g., update address logic 950) such that the logic elements are shared between the branch prediction methods for efficiency. Other logic elements or components may also be shared between branch prediction methods and may include at least one of arrays, predictor update logic, address generation logic, etc.

Figure 10A:
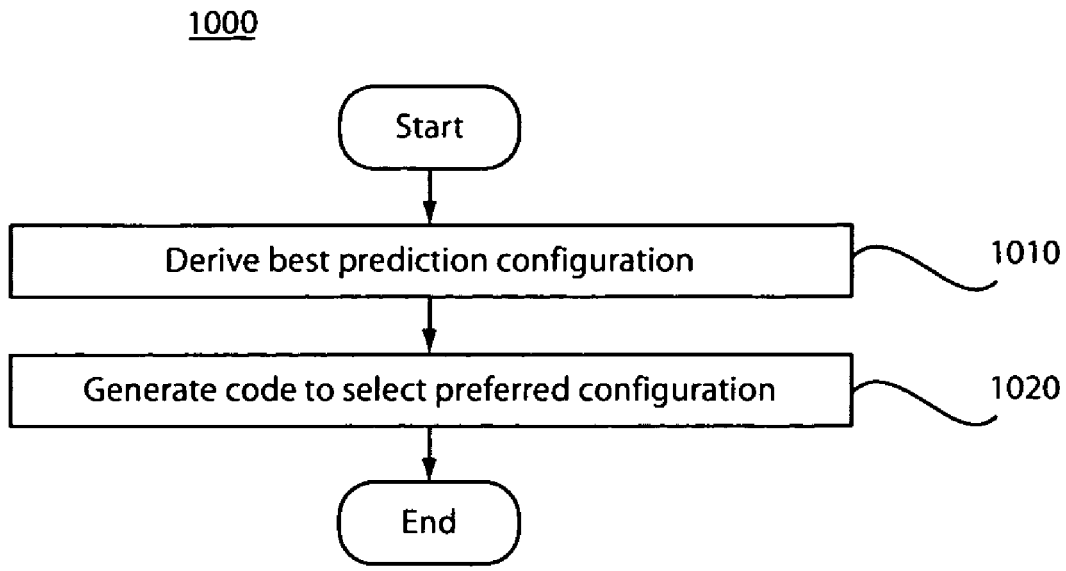
FIG. 10A is a block/flow diagram showing a compiler which generates configuration code to configure branch prediction in accordance with an illustrative embodiment.
Figure 10B:
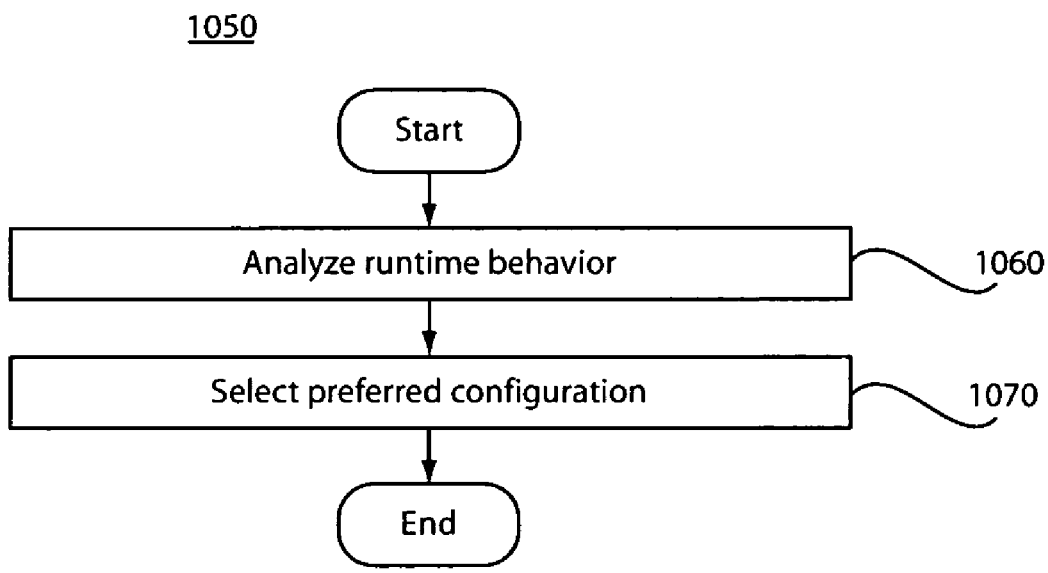
FIG. 10B is a block/flow diagram showing dynamic selection of branch prediction methods, e.g., using continuous profiling optimization in accordance with another illustrative embodiment.

Referring now specifically to FIGS. 10A and 10B, methods for using a polymorphic predictor to optimize application performance are illustratively shown. In accordance with a preferred embodiment, this function is implemented in software, although other embodiments are possible.

Referring more specifically to FIG. 10A, a method 1000 is preferably implemented in a compiler. The method begins with step 1010. In step 1010, a preferred configuration for a polymorphic predictor is derived. In step 1020, code is generated to select the preferred configuration of a polymorphic predictor. Then the method terminates. In accordance with one embodiment, this method is executed by a compiler one time, to select a preferred configuration for the entire application. In accordance with another embodiment, this selection is performed multiple times, e.g., for different program phases. The selection can be based upon user specified directives, such as a command line flag, pragma or other compiler directives inserted in the application code, compiler heuristics or modeling of program properties, and profile directed feedback.

Referring to FIG. 10B, a method 1050 is preferably implemented in an application library, a dynamic compiler, a continuous program optimization module, firmware, or microcode, and is executed at program runtime. The method begins with step 1060. In step 1060, application runtime behavior is analyzed. A variety of program analysis techniques are known, such as including, but not limited to, configuration trial and measurement, and may be used in conjunction with the present invention. In step 1070, a preferred configuration is selected based on application analysis (or application phase analysis). Then, the method terminates.

In accordance with one embodiment, method 1050 may be executed once, to select a preferred configuration for the entire application. In accordance with another embodiment, this selection is performed multiple times during application runtime, e.g., for different program phases. Re-execution can occur at fixed intervals, or when key application metrics change (such as indicated by a performance monitoring infrastructure), at explicit points indicated by the application (e.g., by invoking a dynamic configuration selection function). Dynamic application analysis is preferably performed using support of a performance monitoring infrastructure providing application statistics such as branch execution and prediction information.

Figure 11:
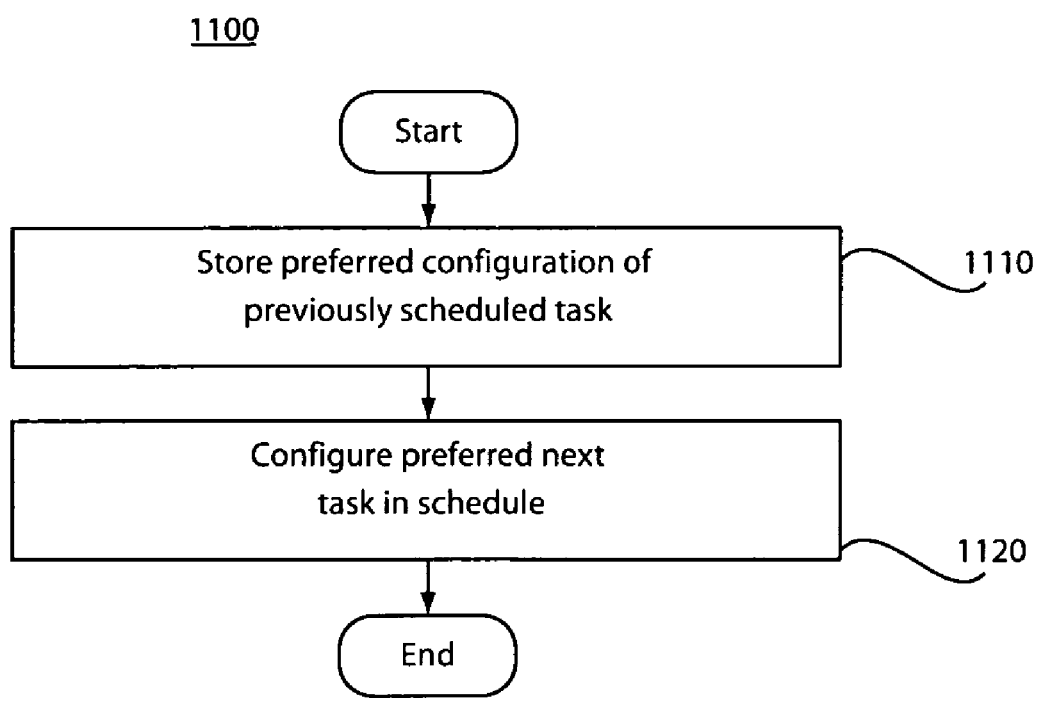
FIG. 11 is a block/flow diagram showing operating system (OS) scheduling (or Hypervisor partition scheduling) in accordance with an illustrative embodiment.

Referring now to FIG. 11, a method 1100 for performing switching between an operating system context or a hypervisor partition. The method 1100 starts with step 1110. In step 1110, the configuration for an application or previously scheduled partition is stored. In one embodiment, the configuration is stored when a process or partition is de-scheduled. In an alternate embodiment, this configuration information is stored when it is updated and maintained in a process or partition-specific structure. In step 1120, the configuration information for the next process or partition is read from previously stored information of step 1110, and polymorphic configuration is updated. The method terminates.

Having described preferred embodiments for methods and apparatus for implementing polymorphic branch predictors (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A polymorphic branch predictor, comprising:
a plurality of branch prediction methods;
a mechanism for dynamically configuring a mode of prediction formed from at least one of the plurality of branch prediction methods responsive to a dynamic setting to optimize performance of the branch predictor during operation where the dynamic setting selects the mode of prediction in accordance with task specific information; and
a storage array for concurrently storing data for at least a first mode of prediction corresponding to a first one of the plurality of branch prediction methods and for a second mode of prediction corresponding to a second one of the plurality of branch prediction methods,
wherein said storage array comprises an array of predictor entries wherein the predictor entries stored in the array of predictor entries are configured with respect to a number and bits of information wherein the first one of the plurality of branch prediction methods is configured to use the predictor entries with m bits in the first mode of prediction, wherein the second one of the plurality of branch prediction methods is configured to use the predictor entries with n bits in the second mode of prediction, wherein m>n, wherein said storage array stores either k predictor entries with m bits, or l predictor entries with n bits, wherein k<l, wherein said storage array has at least two storage bits b0 and b1, wherein the bits b0 and b1 correspond to a single one of the predictor entries with m bits in the first mode of prediction, and wherein the bits b0 and b1 correspond to a first one of the predictor entries with n bits and a second one of the predictor entries with n bits, respectively, in die second mode of prediction.

2. The polymorphic branch predictor as recited in claim 1, wherein the mechanism configures at least two branch prediction methods to work together to provide a result.

3. The polymorphic branch predictor as recited in claim 1, wherein the mechanism configures the at least one branch prediction method for one of an application and a partition by one of an operating system and a hypervisor in advance as the configured mode of prediction for branches being predicted by said polymorphic predictor.

4. The polymorphic branch predictor as recited in claim 3, wherein said storage array stores a configuration mode corresponding to one of a previously scheduled application and a partition and reading configuration information for a next one of an application process and a partition to be configured.

5. The polymorphic branch predictor as recited in claim 1, wherein the mechanism configures the at least one branch prediction method based upon an analysis of runtime behavior as the configured mode of prediction for branches being predicted by said polymorphic predictor.

6. The polymorphic branch predictor as recited in claim 1, wherein the mechanism receives information from one of a compiler and a runtime component to configure the at least one branch prediction methods as the configured mode of prediction for branches being predicted by said polymorphic predictor.

7. The polymorphic branch predictor as recited in claim 1, wherein the mechanism is updated during runtime of an application when a configuration function is invoked by the application.

8. The polymorphic branch predictor as recited in claim 1, wherein the at least one of the plurality of branch prediction methods is configured prior to a prediction result being computed, and wherein the at least one of the plurality of branch prediction methods is dynamically configured further responsive to a configuration mode for the branches predicted by said polymorphic predictor.

9. The polymorphic branch predictor as recited in claim 1, wherein the storage array comprises an array of predictor entries wherein storage in the array of predictor entries is implemented using one of a per-bit write enable signal and a multi-bit write enable signal to permit a write operation to the array of predictor entries,
wherein the array of predictor entries has a data write port,
wherein when per-bit write en able signals are present in said array of predictor entries and the at least one branch prediction method is configured to use multi-bit predictor entries, multiple per-bit write enable signals are asserted when a multi-bit predictor entry is to be written,
wherein when the per-bit write enable signals are present in said array of predictor entries and the at least one prediction method is configured to use single bit predictor entries, a single per-bit write enable signal is asserted when a single bit predictor entry is to be written,
wherein when multi-bit write enable signals are present in said array of predictor entries and the at least one branch prediction method is configured to use the multi-bit predictor entries, a multi-bit write enable signal is asserted when the multi-bit predictor entry is to be written and a single multi-bit predictor entry is presented at the data write port of said array of predictor entries, and
wherein when the multi-bit write enable signals are present in said array of predictor entries and the at least one branch prediction method is configured to use the single bit predictor entries, the multi-bit write enable signal is asserted when the single bit predictor entry is to be written and multiple single bit predictor entries, corresponding to at least one write updated single bit predictor entry, and at least one unmodified single bit predictor entry, corresponding to a previously read and non-updated single bit predictor entry, are present at the data write port of said array of predictor entries.

10. The polymorphic branch predictor as recited in claim 1, further comprising an array of predictor entries and a branch information queue wherein information is used from the branch information queue to re-write previously read information from the array of predictor entries, wherein the re-written information is maintained unmodified from an initial reading from the array of predictor entries until and including being re-written to the array of predictor entries.

11. The polymorphic branch predictor as recited in claim 1, further comprising addressing logic for generating and selecting address for two arrays corresponding to a storage of two predictors of a multi-component predictor when the first one of the plurality of branch prediction methods is configured, and for generating addresses corresponding to a use of the two arrays as a single unified array of a single unified predictor having an absence of multiple components when the second one of the plurality of branch prediction methods is configured, wherein a first one of the two arrays stores all predictor entries corresponding to a first one of the two predictors of the multi-component predictor when the first one of the plurality of branch prediction methods is configured, and stores a portion of the predictor entries corresponding to the single unified predictor when the second one of the plurality of branch prediction methods is configured, wherein a second one of the two arrays stores all predictor entries corresponding to a second one of the two predictors of the multi-component predictor when the first one of the plurality of branch prediction methods is configured, and stores another portion of the predictor entries corresponding to the single unified predictor when the second one of the plurality of branch prediction methods is configured, and wherein a predictor entry of the single unified predictor corresponds exclusively to either the portion of the predictor entries in the first one of the two arrays or the other portion of the predictor entries in the second one of the two arrays, when the second one of the plurality of branch prediction methods is configured.

12. The polymorphic branch predictor as recited in claim 11, wherein said mechanism selects one of the two arrays having a predictor stored therein corresponding to a particular address, by computing a hash code of the particular address.

13. A polymorphic branch predictor, comprising:
a plurality of branch prediction methods;
a mechanism for dynamically configuring a mode of prediction formed from at least one of the plurality of branch prediction methods responsive to a dynamic setting to optimize performance of the branch predictor during operation where the dynamic setting selects the mode of prediction in accordance with task specific information; and
a storage array for concurrently storing data for at least a first mode of prediction corresponding to a first one of the plurality of branch prediction methods and for a second mode of prediction corresponding to a second one of the plurality of branch prediction methods,
wherein said storage array comprises an array of predictor entries wherein the predictor entries stored in the array of predictor entries are configured with respect to a number and bits of information wherein the first one of the plurality of branch prediction methods is configured to use the predictor entries with 2 bits in the first mode of prediction, wherein the second one of the plurality of branch prediction methods is configured to use the predictor entries with 1 bit in the second mode of prediction, wherein said storage array stores either n/2 predictor entries with 2 bits, or n predictor entries with 1 bits, wherein said storage array has at least two storage bits b0 and b1, wherein the bits b0 and b1 correspond to a single one of the predictor entries with 2 bits in the first mode of prediction, and wherein the bits b0 and b1 correspond to a first one of the predictor entries with 1 bit and a second one of the predictor entries with 1 bit, respectively, in the second mode of prediction.

14. The polymorphic branch predictor as recited in claim 13, wherein the mechanism configures at least two branch prediction methods to work together to provide a result.

15. The polymorphic branch predictor as recited in claim 13, wherein the mechanism configures the at least one branch prediction method for one of an application and a partition by one of an operating system and a hypervisor in advance as the configured mode of prediction for branches being predicted by said polymorphic predictor.

16. The polymorphic branch predictor as recited in claim 13, wherein the mechanism configures the at least one branch prediction method based upon an analysis of runtime behavior as the configured mode of prediction for branches being predicted by said polymorphic predictor.

17. A method for dynamically selecting a branch prediction method, comprising:
providing a plurality of branch prediction methods;
dynamically configuring a mode of prediction formed from at least one of die plurality of branch prediction methods responsive to a dynamic setting to optimize performance of the branch predictor during operation where the dynamic setting selects the mode of prediction in accordance with task specific information; and
concurrently storing data for at least a first mode of prediction corresponding to a first one of the plurality of branch prediction methods and for a second mode of prediction corresponding to a second one of the plurality of branch prediction methods,
wherein said storing step concurrently stores the data in a storage array that comprises an array of predictor entries wherein the predictor entries stored in the array are configured with respect to a number and bits of information wherein the first one of the plurality of branch prediction methods is configured to use the predictor entries with 2 bits in the first mode of prediction, wherein the second one of the plurality of branch prediction methods is configured to use the predictor entries with 1 bit in the second mode of prediction, wherein said storage array stores either n/2 predictor entries with 2 bits, or n predictor entries with 1 bits, wherein said storage array has at least two storage bits b0 and b1, wherein the bits b0 and b1 correspond to a single one of the predictor entries with 2 bits in the first mode of prediction, and wherein the bits b0 and b1 correspond to a first one of the predictor entries with 1 bit and a second one of the predictor entries with 1 bit, respectively, in the second mode of prediction.

18. The method as recited in claim 17, wherein said configuring step configures at least two branch prediction methods to work together to provide a result.

19. The method as recited in claim 17, wherein said configuring step configures the at least one branch prediction method for one of an application and a partition by one of an operating system and a hypervisor in advance as the configured mode of prediction for branches being predicted by the method.

20. The method as recited in claim 17, wherein said configuring step configures the at least one branch prediction method based upon an analysis of runtime behavior as the configured mode of prediction for branches being predicted by the method.

* * * * *